No. 790,228. PATENTED MAY 16, 1905.
J. S. ROHRER.
CULINARY DEVICE.
APPLICATION FILED FEB. 8, 1905.

Witnesses

Inventor
John S. Rohrer
By
R. W. B. Lacey, Attorneys

No. 790,228. Patented May 16, 1905.

UNITED STATES PATENT OFFICE.

JOHN S. ROHRER, OF LANCASTER, PENNSYLVANIA.

CULINARY DEVICE.

SPECIFICATION forming part of Letters Patent No. 790,228, dated May 16, 1905.

Application filed February 8, 1905. Serial No. 244,784.

*To all whom it may concern:*

Be it known that I, JOHN S. ROHRER, a citizen of the United States, residing at Lancaster, in the county of Lancaster and State of Pennsylvania, have invented certain new and useful Improvements in Culinary Devices, of which the following is a specification.

This invention aims to provide an improved culinary article in the form of an implement adapted for various uses in the kitchen.

The invention embodies a tool having combined means for scraping hard surfaces, for handling vegetables in preparing the same for cooking, and for accomplishing various other functions for which a device such as above described may well be used.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1:
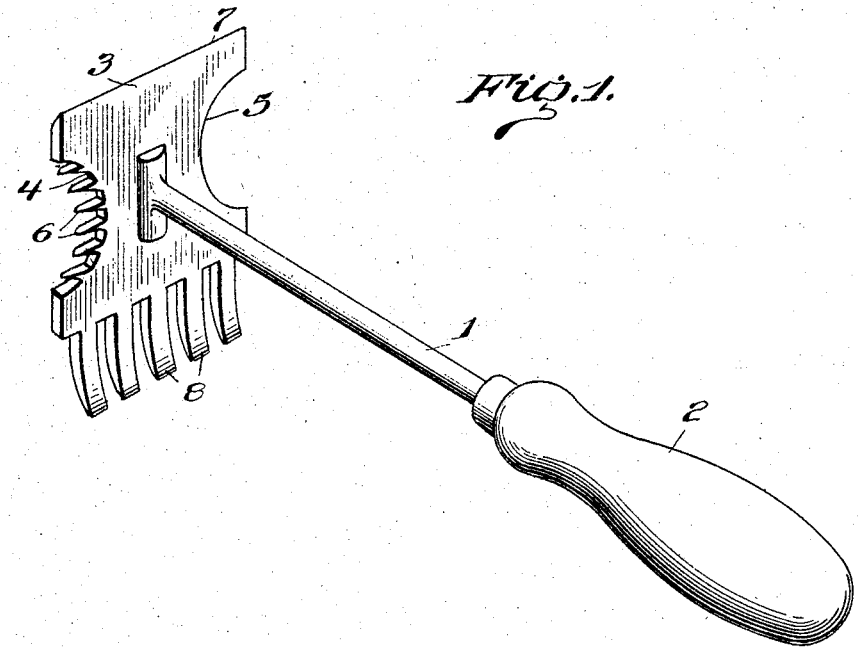
Figure 2:
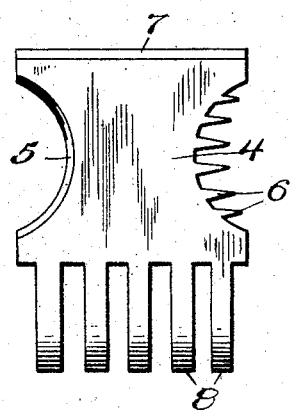
Figure 3:
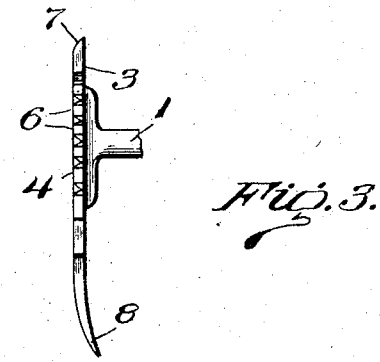

Figure 1 is a perspective view of a device embodying the invention. Fig. 2 is a front elevation. Fig. 3 is a side elevation, the shank being broken away.

Corresponding and like parts are referred to in the following description and indicated in all the views of the drawings by the same reference characters.

A feature of the invention resides in the general simplicity of the same, whereby the articles constructed in accordance with the invention may be manufactured very cheaply, this being a desideratum in this class of inventions.

The invention comprises, essentially, a shank 1, provided at one end with a handle 2 and at its opposite end with a head 3. The head 3 is of peculiar construction and is preferably made from a plate of approximately rectangular form. Opposite edges of the plate are curved, as shown at 4 and 5, and the curved portion 4 is provided with a plurality of pointed projections 6, extending outwardly therefrom. The opposite curved portion 5 of the head 3, however, is sharpened, so as to form a cutting edge. The portions 4 and 5 of the head are particularly designed for operating upon vegetables and more especially for removing corn from the cob. In this instance the cob is held in one hand and by engaging the projections 6 with the grains said projections act as grating-teeth to open the grains preparatory to use of the oppositely-disposed curved edge portion 5 of the head 3. When the grains of the corn have been opened, the curved or concaved edge 5 will be used to scrape the meat, and thereby remove the same from the cob in an effective manner. The other edges of the head 3 are straight, one of said straight edges being sharpened, as shown at 7, the other having a plurality of teeth 8 projecting therefrom. The teeth 8 are of rectangular form and the same are used in shredding pineapple, preferably in a manner which will be clear to those versed in this art. The straight edge portion 7 of the head 3 will be used for scraping hard surfaces, such as breadboards or the like.

Having thus described the invention, what is claimed as new is—

In a culinary-tool comprising a shank, a head consisting of a flat plate of approximately rectangular form, opposite edge portions of the plate being curved or concaved, a plurality of projections extending from one of the curved or concaved edge portions, the other edge portions of the plate being straight, one of the straight edge portions being sharpened to form a scraper, and a plurality of shredding-teeth projecting from the other of the said straight edge portions of the head.

In testimony whereof I affix my signature in presence of two witnesses.

JOHN S. ROHRER. [L. S.]

Witnesses:
R. V. ALEXANDER,
H. M. MAYER.